(12) United States Patent
Shin et al.

(10) Patent No.: US 9,588,376 B2
(45) Date of Patent: Mar. 7, 2017

(54) LIQUID CRYSTAL DISPLAY

(71) Applicant: Samsung Display Co., Ltd., Yongin, Gyeonggi-Do (KR)

(72) Inventors: Dong-Chul Shin, Seoul (KR); Jae Hong Park, Seoul (KR); Oh Jeong Kwon, Hwaseong-si (KR); Ki Chul Shin, Seongnam-si (KR); Sung-Jae Yun, Hwaseong-si (KR); Hyeok Jin Lee, Seongnam-si (KR)

(73) Assignee: SAMSUNG DISPLAY CO., LTD., Yongin (KR)

( * ) Notice: Subject to any disclaimer, the term of this patent is extended or adjusted under 35 U.S.C. 154(b) by 189 days.

(21) Appl. No.: 14/158,153

(22) Filed: Jan. 17, 2014

(65) Prior Publication Data

US 2015/0055065 A1 Feb. 26, 2015

(30) Foreign Application Priority Data

Aug. 26, 2013 (KR) .......................... 10-2013-0101129

(51) Int. Cl.
G02F 1/1343 (2006.01)
G02F 1/1337 (2006.01)
G02F 1/1333 (2006.01)
G02F 1/1362 (2006.01)

(52) U.S. Cl.
CPC .. G02F 1/133707 (2013.01); G02F 1/133753 (2013.01); G02F 1/133788 (2013.01); *G02F 1/13624* (2013.01); *G02F 1/133345* (2013.01); *G02F 1/136209* (2013.01); *G02F 2001/133726* (2013.01); *G02F 2001/133746* (2013.01); *G02F 2001/133757* (2013.01); *G02F 2001/136222* (2013.01); *G02F 2201/40* (2013.01)

(58) Field of Classification Search
CPC ............. G02F 1/134336; G02F 1/1337; G02F 2201/40

See application file for complete search history.

(56) References Cited

U.S. PATENT DOCUMENTS

| 6,342,938 B1 * | 1/2002 | Song ................. G02F 1/133707 |
| | | 349/129 |
| 6,657,693 B1 | 12/2003 | Jeong et al. |
| 7,064,348 B2 | 6/2006 | Kim et al. |
| 7,728,938 B2 | 6/2010 | Chang et al. |
| 8,421,986 B2 | 4/2013 | Chen et al. |
| 2004/0070714 A1 * | 4/2004 | Ishii .................. G02F 1/134309 |
| | | 349/129 |

(Continued)

FOREIGN PATENT DOCUMENTS

JP 2011085738 A 4/2011

*Primary Examiner* — Ryan Crockett
(74) *Attorney, Agent, or Firm* — Cantor Colburn, LLP

(57) ABSTRACT

A liquid crystal display includes a first substrate, a second substrate disposed opposite to the first substrate; a pixel electrode disposed on the first substrate; a common electrode disposed on the second substrate; and a liquid crystal layer disposed between the first substrate and the second substrate, where a first cutout having a cross shape is defined in the common electrode, a second cutout is defined in the pixel electrode to be adjacent to and along an edge of the pixel electrode, and the pixel electrode has a step structure, a boundary line of which is in a rhombus shape.

22 Claims, 12 Drawing Sheets

(56) References Cited

U.S. PATENT DOCUMENTS

| | | | |
|---|---|---|---|
| 2005/0030462 A1* | 2/2005 | Shih | G02F 1/133707 349/143 |
| 2006/0012741 A1* | 1/2006 | Mizusako | G02F 1/133707 349/130 |
| 2010/0283951 A1* | 11/2010 | Lee | C09K 19/12 349/124 |
| 2011/0037932 A1* | 2/2011 | Takahashi | G02F 1/133707 349/129 |
| 2011/0121303 A1* | 5/2011 | Kim | G02F 1/136213 257/59 |
| 2011/0261278 A1 | 10/2011 | Oh et al. | |
| 2012/0188477 A1* | 7/2012 | Jung | G02F 1/133707 349/42 |
| 2012/0281172 A1* | 11/2012 | Park | G02F 1/133707 349/123 |
| 2012/0281173 A1* | 11/2012 | Kwon | G02F 1/133707 349/123 |
| 2013/0201432 A1* | 8/2013 | Yun | G02F 1/134309 349/123 |
| 2013/0242239 A1* | 9/2013 | Chang et al. | 349/106 |

* cited by examiner

LIQUID CRYSTAL DISPLAY

This application claims priority to Korean Patent Application No. 10-2013-0101129, filed on Aug. 26, 2013, and all the benefits accruing therefrom under 35 U.S.C. §119, the contents of which are incorporated by reference herein in its entirety.

BACKGROUND (a) Field

The invention relates to a liquid crystal display ("LCD"), and more particularly, to an LCD with improved aperture ratio and improved liquid crystal controlling power.

(b) Description of the Related Art

A liquid crystal display ("LCD"), which is one of the most widely used types of flat panel display, typically includes two display panels on which field generating electrodes, such as a pixel electrode and a common electrode, are provided, and a liquid crystal layer disposed therebetween. The LCD generates an electric field on the liquid crystal layer by applying voltage to the electric field generating electrode, determines a direction of liquid crystal molecules of the liquid crystal layer through the generated electric field, and displays an image by controlling polarization of incident light.

Among LCDs, in a vertically aligned ("VA") mode LCD, in which liquid crystal molecules are aligned to enable a longitudinal axes thereof to be vertical with respect to a display panel in a state in which an electric field is not generated therein, a method of forming a cutout such as a micro slit on an electric field generating electrode is used to secure a wide viewing angle. In such a VA mode LCD, a cutout and a protrusion may determine a tilt direction in which liquid crystal molecules are tilted. Accordingly, a viewing angle may be improved by appropriately disposing the cutout and the protrusion and thereby distributing tilting directions of the liquid crystal molecules into a plurality of directions.

In such a VA mode LCD, when a plurality of branch electrodes are provided by forming a micro slit on a pixel electrode, an aperture ratio of the LCD may decrease.

SUMMARY

Exemplary embodiments of the invention provide a liquid crystal display ("LCD") with improved aperture ratio and having a wide viewing angle and a quick response speed.

Exemplary embodiments of the invention also provide an LCD with improved liquid crystal controlling power.

An exemplary embodiment of the invention provides an LCD including: a first substrate; a second substrate disposed opposite to the first substrate; a pixel electrode disposed on the first substrate; a common electrode disposed on the second substrate; and a liquid crystal layer disposed between the first substrate and the second substrate, where a first cutout having a cross shape is defined in the common electrode, a second cutout is defined in the pixel electrode to be adjacent to and along an edge of the pixel electrode, the pixel electrode has a step structure, and a boundary line of the step structure has a rhombus shape.

In an exemplary embodiment, the first cutout may overlap two diagonal lines in the rhombus shape of the boundary line of the step structure.

In an exemplary embodiment, a vertex of the rhombus shape of the boundary line of the step structure may be chamfered.

In an exemplary embodiment, a side surface of the pixel electrode at the boundary line of the step structure may form an angle in a range of about 35 degrees to about 65 degrees with the first substrate.

In an exemplary embodiment, the step structure may have a height difference in a range of about 500 angstroms (Å) to about 2,200 Å.

In an exemplary embodiment, an angle between the boundary line of the step structure and the first cutout may be in a range of about 40 degrees to about 50 degrees.

In an exemplary embodiment, the LCD may further include a passivation layer disposed below the pixel electrode, where an opening in the rhombus shape is defined in the passivation layer.

In an exemplary embodiment, the boundary line of the step structure may match an outline of the opening in the passivation layer.

In an exemplary embodiment, the first cutout may overlap two diagonal lines in the rhombus shape of the opening in the passivation layer.

In an exemplary embodiment, a vertex of the rhombus shape of the opening in the passivation layer may be chamfered.

In an exemplary embodiment, a side surface of the passivation layer which defines the opening may have a tapered angle in a range of about 35 degrees to about 65 degrees.

In an exemplary embodiment, a thickness of the passivation layer may be in a range of about 500 Å to about 2,200 Å.

In an exemplary embodiment, an angle between an outline of the opening and the first cutout may be in a range of about 40 degrees to about 50 degrees.

In an exemplary embodiment, the LCD may further include an organic material layer disposed below the passivation layer, where the organic material layer may include a groove portion in the rhombus shape.

In an exemplary embodiment, the organic material layer may include at least one of a color filter, an organic insulating layer and an overcoat.

In an exemplary embodiment, the boundary line of the step structure may match an outline of the groove portion.

In an exemplary embodiment, the first cutout may overlap two diagonal lines in the rhombus shape of the groove portion.

In an exemplary embodiment, a side surface of the groove portion may form an angle in a range of about 35 degrees to about 65 degrees with respect to a bottom surface of the groove portion.

In an exemplary embodiment, the LCD may further include: a first alignment layer disposed on the first substrate and the pixel electrode; and a second alignment layer disposed on the second substrate and the common electrode, where the first alignment layer and the second alignment layer may be vertical alignment layers, the liquid crystal layer may include liquid crystal molecules and reactive mesogen, and the liquid crystal molecules may be aligned to have a pretilt angle.

In an exemplary embodiment, the LCD may further include: a first alignment layer disposed on the first substrate and the pixel electrode; and a second alignment layer disposed on the second substrate and the common electrode, where the first alignment layer and the second alignment layer may include an alignment material and reactive mesogen, and the first alignment layer and the second alignment layer may align liquid crystal molecules in the liquid crystal layer to have a pretilt angle.

In exemplary embodiments, the LCD may have an expanded viewing angle, improved response speed and increased aperture ratio by providing a first cutout having a cross shape in the common electrode and a second cutout in the pixel electrode to be adjacent to an edge of the pixel electrode.

In such embodiments, the pixel electrode has a step structure having a boundary line in a rhombus shape, such that a liquid crystal controlling power is improved.

BRIEF DESCRIPTION OF THE DRAWINGS

The above and other features of the invention will become more apparent by describing in detail exemplary embodiments thereof with reference to the accompanying drawings, in which.

DETAILED DESCRIPTION OF THE EMBODIMENTS

Figure 1:
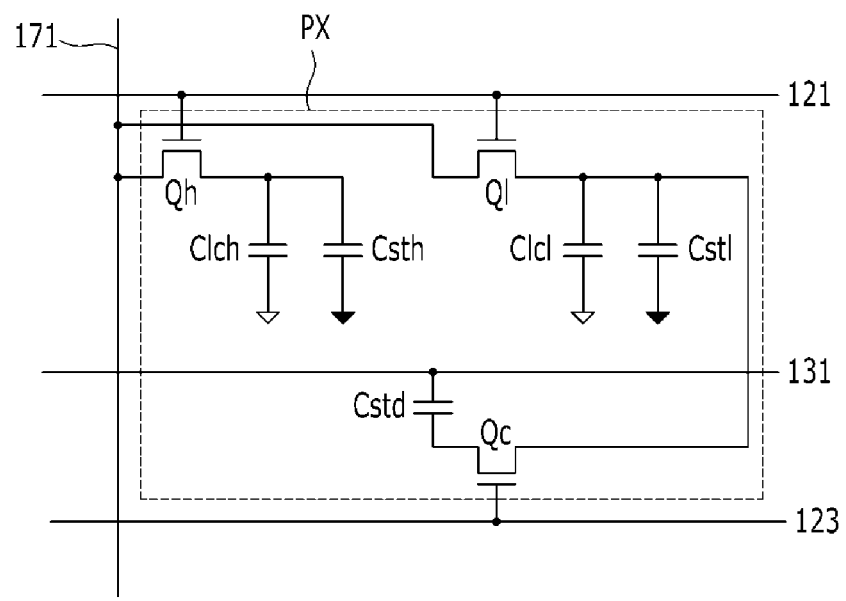
FIG. 1 is an equivalent circuit diagram illustrating a pixel of an exemplary embodiment of a display device, according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a pixel of an exemplary embodiment of a display device, according to the invention will be briefly described below with reference to FIGS. 1 and 2.

Figure 2:
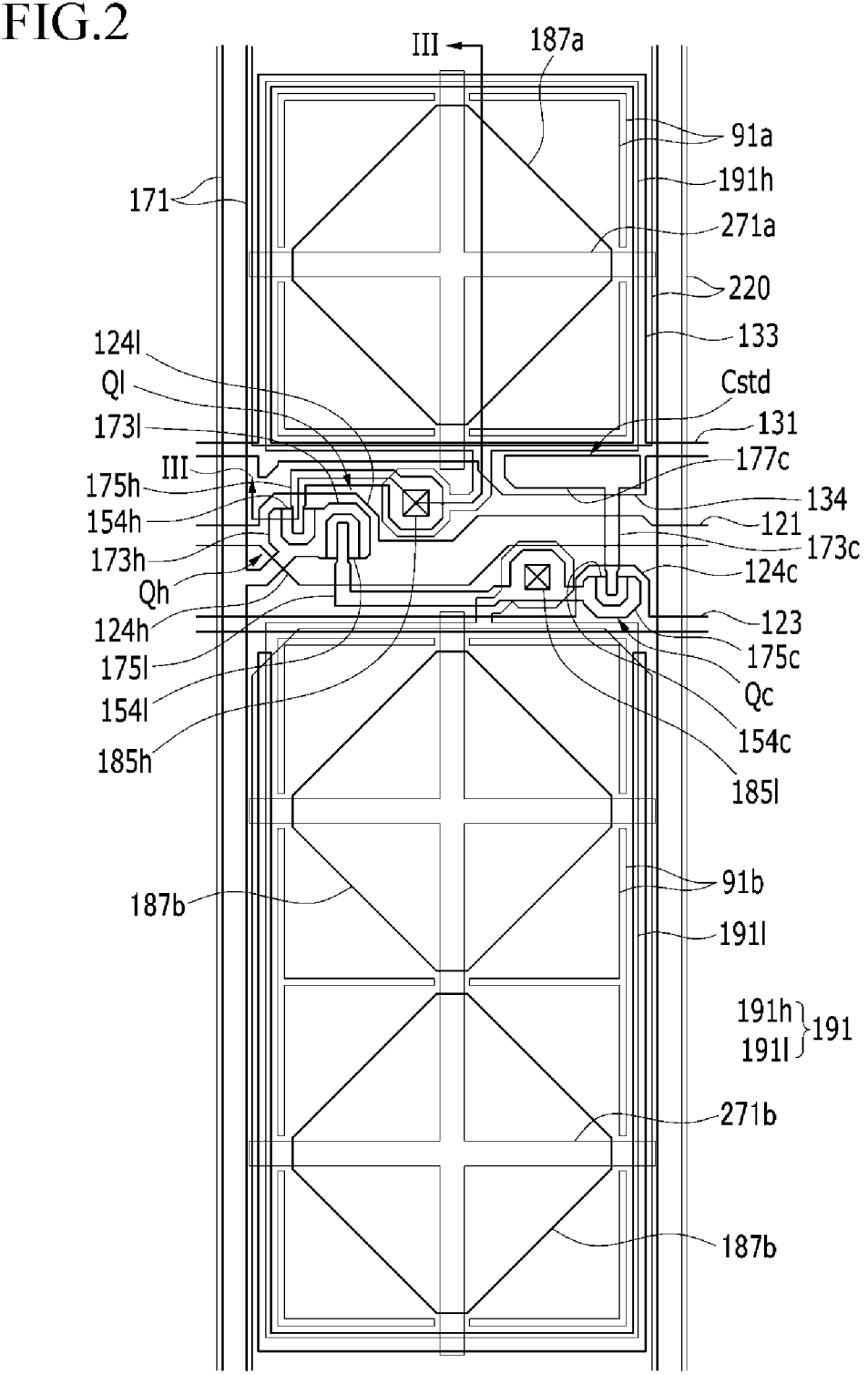
FIG. 2 is a layout view illustrating a pixel of an exemplary embodiment of a display device, according to the invention.

FIG. 1 is an equivalent circuit diagram illustrating a pixel of an exemplary embodiment of a display device, according to the invention, and FIG. 2 is a plan view illustrating a pixel of an exemplary embodiment of a display device, according to the invention.

An exemplary embodiment of the display device includes signal lines such as a gate line 121, a storage electrode line 131, a decompression gate line 123 and a data line 171.

In such an embodiment, the display device further includes a first switching element (Qh), a second switching element (Ql), a third switching element (Qc), a first liquid crystal capacitor (Clch), a second liquid crystal capacitor (Clcl), a first storage capacitor (Csth), a second storage capacitor (Cstl) and a decompression capacitor (Cstd), which are connected to the signal lines. Hereinafter, the first switching element (Qh) may be referred to as a first thin film transistor (Qh), the second switching element (Ql) may be referred to as a second thin film transistor (Ql), and the third switching element (Qc) may be referred to as a third thin film transistor (Qc).

Each of the first and second switching elements (Qh and Ql) are connected to the gate line 121 and the data line 171. The third switching element (Qc) is connected to the decompression gate line 123.

Figure 3:
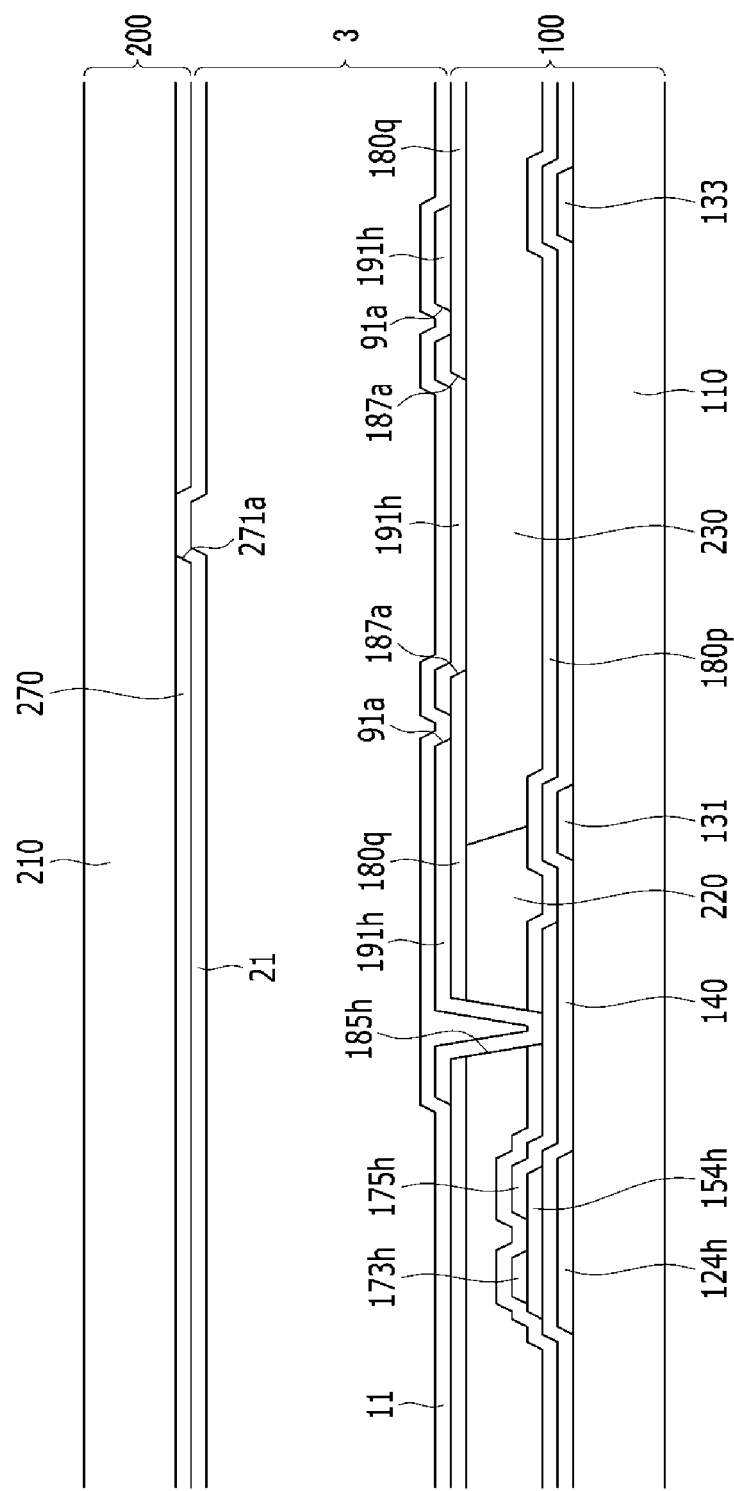
FIG. 3 is a cross-sectional view taken along line III-III of a the display device shown in FIG. 2, where the display device is an liquid crystal display ("LCD")

The first and second switching elements (Qh and Ql) are three-terminal elements, e.g., thin film transistors, disposed on a first substrate 110 (shown in FIG. 3). Control terminals of the first and second switching elements (Qh and Ql) are connected to the gate line 121, input terminals of the first and second switching elements (Qh and Ql) are connected to the data line 171, and output terminals of the first and second switching elements (Qh and Ql) are connected to the first and second liquid crystal capacitor (Clch and Clcl) and the first and second storage capacitor (Csth and Cstl), respectively.

The third switching element (Qc) is also a three-terminal element, e.g., a thin film transistor, disposed on the first substrate 110. A control terminal of the third switching element (Qc) is connected to the decompression gate line 123, an input terminal of the third switching element (Qc) is connected to the decompression capacitor (Cstd), and an output terminal of the third switching element (Qc) is connected to the second liquid crystal capacitor (Clcl).

The first and second liquid crystal capacitors (Clch and Clcl) are configured by overlapping portions of a common electrode 270 and the first and second sub-pixel electrodes 191h and 191l that are connected to the first and second switching elements (Qh and Ql), respectively. The first and second storage capacitors (Csth and Cstl) are configured by overlapping portions of the first and second sub-pixel electrodes 191h and 191l, and the storage electrode line 131.

The decompression capacitor (Cstd) is connected to the input terminal of the third switching element (Qc) and the storage electrode line 131, and configured by overlapping portions of the storage electrode line 131 and the input terminal of the third switching element (Qc) with an insulator disposed between the overlapping portions.

Next, an exemplary embodiment of a driving method of the display device illustrated in FIGS. 1 and 2 will be described.

When a gate-on signal is applied to the gate line 121, the first switching element (Qh) and the second switching element (Ql) connected thereto are turned on. Accordingly, data voltage applied to the data line 171 is applied to the first sub-pixel electrode 191h and the second sub-pixel electrode 191l through the turned-on first switching element (Qh) and second switching element (Ql). Here, substantially the same magnitude of data voltage is applied to the first sub-pixel electrode 191h and the second sub-pixel electrode 191l. Accordingly, substantially the same voltage is charged to the first and second liquid crystal capacitors (Clch and Clcl).

Next, when a gate-off signal is applied to the gate line 121 and a gate-on signal is applied to the decompression gate line 123, the first switching element (Qh) and the second switching element (Ql) are turned off and the third switching element (Qc) is turned on. Next, charges move from the second sub-pixel electrode 191l to the decompression capacitor (Cstd) through the turned-on third switching element (Qc). Next, charging voltage of the second liquid crystal capacitor (Clcl) decreases and the decompression capacitor (Cstd) is charged. The charging voltage of the second liquid crystal capacitor (Clcl) decreases by capacitance of the decompression capacitor (Cstd) and thus, the charging voltage of the second liquid crystal capacitor (Clcl) decreases to be lower than the charging voltage of the first liquid crystal capacitor (Clch).

Here, charging voltages of two liquid crystal capacitors (Clch and Clcl) in a pixel indicates a different gamma curve, and a gamma curve of a pixel voltage becomes a curve in which the charging voltages of the two liquid crystal capacitors (Clch and Clcl) are combined. In such an embodiment, a combined gamma curve from a front view matches a reference gamma curve of the front view, which may be predetermined as an optimal gamma curve for the front view, and a combined gamma curve from a side view may be substantially closest to the reference gamma curve of the front view. As described above, in such an embodiment, a side visibility is substantially improved by controlling charging voltages of the two liquid crystal capacitors (Clch and Clcl) based on image data.

Hereinafter, an exemplary embodiment of a liquid crystal display ("LCD"), according to the invention, will be further described with reference to FIGS. 2 and 3.

FIG. 3 is a cross-sectional view taken along line III-III of the display device shown in FIG. 2, where the display device is an LCD.

An exemplary embodiment of the LCD includes a lower panel 100 and an upper panel 200 disposed to face each other, and a liquid crystal layer 3 disposed between the lower panel 100 and the upper panel 200.

Hereinafter, the lower panel 100 will be described in greater detail.

The gate line 121, the decompression gate line 123 and the storage electrode line 131 are disposed on the first substrate 110.

The gate line 121 and the decompression gate line 123 extend substantially in a horizontal direction and transfer a gate signal. A first gate electrode 124h and a second gate electrode 124*l* are protruded from the gate line 121, and a third gate electrode 124*c* is protruded from the decompression gate line 123. The first gate electrode 124*h* and the second gate electrode 124*l* may be connected to each other to thereby form a single protruding portion. In such an embodiment, the protruding shape of the first, second and third gate electrodes 124*h*, 124*l* and 124*c* may be variously modified.

The storage electrode line 131 extends substantially in the horizontal direction and transfers determined voltage such as common voltage. A storage electrode 133 and a protruding portion 134 are protruded from the storage electrode line 131. The storage electrode 133 may surround a pixel electrode 191. The protruding portion 134 may be protruded toward the gate line 121.

A gate insulating layer 140 is disposed on the gate line 121, the first to third gate electrodes 124*h*, 124*l* and 124*c*, the storage electrode line 131, the storage electrode 133, and the protruding portion 134. The gate insulating layer 140 may include an inorganic insulating material such as silicon nitride (SiNx) and silicon oxide (SiOx), for example. Also, the gate insulating layer 140 may have a single-layer structure or a multi-layer structure.

A first semiconductor 154*h*, a second semiconductor 154*l* and a third semiconductor 154*c* are disposed on the gate insulating layer 140. The first semiconductor 154*h* may be in a region corresponding to the first gate electrode 124*h*, the second semiconductor 154*l* may be in a region corresponding to the second gate electrode 124*l*, and the third semiconductor 154*c* may be in a region corresponding to the third gate electrode 124*c*.

The first to third semiconductors 154*h*, 154*l* and 154*c* may include amorphous silicon, polycrystalline silicon or metal oxide, for example.

An ohmic contact (not shown) may be further disposed on each of the first to third semiconductors 154*h*, 154*l* and 154*c*.

A data conductor including the data line 171, a first source electrode 173*h*, a second source electrode 173*l*, a third source electrode 173*c*, a first drain electrode 175*h*, a second drain electrode 175*l* and a third drain electrode 175*c* is disposed on the first to third semiconductors 154*h*, 154*l* and 154*c*.

In an exemplary embodiment, the first to third semiconductors 154*h*, 154*l* and 154*c* may be disposed on the first to third gate electrodes 124*h*, 124*l* and 124*c*, respectively, and may be disposed below the data line 171. In an exemplary embodiment, the second semiconductor 154*l* and the third semiconductor 154*c* may be connected to each other. However, the invention is not limited thereto. In an alternative exemplary embodiment, the first to third semiconductors 154*h*, 154*l* and 154*c* may be disposed only on the first to third gate electrodes 124*h*, 124*l* and 124*c*, and the second semiconductor 154*l* and the third semiconductor 154*c* may be spaced apart from each other.

The data line 171 transfers a data signal and extends substantially in a vertical direction to cross the gate line 121 and the decompression gate line 123.

The first source electrode 173*h* is protruded from the data line 171 and disposed on the first gate electrode 124*h*, and the second source electrode 173*l* is disposed on the second gate electrode 124*l*. The first source electrode 173*h* and the second source electrode 173*l* are connected to each other and are applied with a same data signal from the data line 171.

Each of the first drain electrode 175*h* and the second drain electrode 175*l* include a wide end portion and a bar-shaped end portion. The bar-shaped end portions of the first drain electrode 175*h* and the second drain electrode 175*l* are partially surrounded by the first source electrode 173*h* and the second source electrode 173*l*. The wide end portion of the second drain electrode 175*l* further extends and is connected to the third drain electrode 175*c* bent in a U-like shape.

The third source electrode 173*c* is disposed on the protruding portion 134 and the third gate electrode 124*c*. An end of the third source electrode 173*c* is disposed to face the third drain electrode 175*c* on the third gate electrode 124*c*.

The first, second and third gate electrodes 124*h*, 124*l* and 124*c*, the first, second and third source electrodes 173*h*, 173*l* and 173*c*, and the first, second and third drain electrodes 175*h*, 175*l* and 175*c* collectively define first, second and third thin film transistors (Qh, Ql, and Qc) together with the first, second and third semiconductors 154*h*, 154*l* and 154*c*, respectively. A channel of each of the first, second and third thin film transistors (Qh, Ql, and Qc) is formed on a corresponding semiconductor of the first to third semiconductors 154*h*, 154*l*, and 154*c* between a corresponding source electrode of the first to third source electrodes 173*h*, 173*l* and 173*c* and a corresponding drain electrode of the first to third drain electrodes 175*h*, 175*l* and 175*c*.

A first passivation layer 180*p* is disposed on the data line 171, the first to third source electrodes 173*h*, 173*l* and 173*c*, the first to third drain electrodes 175*h*, 175*l* and 175*c*, and an exposed portion of the first to third semiconductors 154*h*, 154*l* and 154*c* between the first to third source electrodes 173*h*, 173*l* and 173*c*, and the first to third drain electrodes 175*h*, 175*l* and 175*c*, respectively. The first passivation layer 180*p* may include an inorganic insulating material such as silicon nitride (SiNx) and silicon oxide (SiOx), for example.

A color filter 230 is disposed on the first passivation layer 180*p*. The color filter 230 is positioned on substantially an entire region of the first substrate 110 excluding regions at which the first thin film transistor (Qh), the second thin film transistor (Ql) and the third thin film transistor (Qc) are positioned. In an alternative exemplary embodiment, the color filter 230 may extend to be elongated in a vertical direction along the neighboring data line 171. Each color filter 230 may display one of primary colors, such as three primary colors of red, green and blue, but not being limited thereto. In an alternative exemplary embodiment, the color filter 230 may display cyan, magenta, yellow and white-based color.

A light blocking member 220 is disposed on a region, in which the color filter 230 is not positioned, and on a portion of the color filter 230. The light blocking member 220 is also referred to as a black matrix and blocks a light leakage. The light blocking member 220 extends along the gate line 121 and the decompression gate line 123 and may be vertically arranged. In such an embodiment, the light blocking member 220 may include a horizontal light blocking member configured to cover a region in which the first thin film transistor (Qh), the second thin film transistor (Ql) and the third thin film transistor (Qc) are positioned, and a vertical light blocking member that extends along the data line 171. A height of a portion of the light blocking member 220 may be lower than a height of the color filter 230.

A second insulating layer 180*q* is disposed on the color filter 230 and the light blocking member 220. The second insulating layer 180*q* may include an inorganic insulating material such as SiNx and SiOx, for example. The second passivation layer 180*q* effectively prevents the color filter 230 and the light blocking member 220 from being gaped from a layer therebelow, substantially reduces contamination of the liquid crystal layer 3 by an organic material such as a solvent inflowing from the color filter 230, and thereby effectively prevents a defect such as an afterimage that may occur when displaying an image on a screen of the LCD.

A first contact hole 185h and a second contact hole 185l configured to expose the wide end portion of the first drain electrode 175h and the wide end portion of the second drain electrode 175l, respectively, are defined, e.g., formed, through the first passivation layer 180p, the light blocking member 220 and the second passivation layer 180q.

Also, openings 187a and 187b in a rhombus shape are defined on the second passivation layer 180q. As illustrated in FIG. 2, a vertex of the rhombus shape of the openings 187a and 187b may be chamfered. A side surface of the second passivation layer 180q exposed by the openings 187a and 187b may be tapered at an angle of in a range of about 35 degrees to about 65 degrees.

A thickness of the second passivation layer 180q may be in a range of about 500 angstroms (Å) to about 2,200 Å. Accordingly, a step corresponding to the thickness of the second passivation layer 180q in a range of about 500 Å to about 2,200 Å may be formed between a portion of the second passivation layer 180q in which the openings 187a and 187b are defined and a portion of the second passivation layer 180q in which the openings 187a and 187b are not defined.

The pixel electrode 191 is disposed on the second passivation layer 180q. Second cutouts 91a and 91b adjacent to and along at least a portion of an edge of the pixel electrode 191 is defined in the pixel electrode 191. In such an embodiment, where the second cutouts 91a and 91b are defined in the pixel electrode 191 along the edge of the pixel electrode 191, a fringe field is generated even on an edge of a pixel region, alignment of liquid crystal molecules may be effectively adjusted in a predetermined direction. The pixel electrode 191 may include a transparent conductive material such as indium tin oxide ("ITO") and indium zinc oxide ("IZO"), for example.

The pixel electrode 191 has a step structure at a boundary line of the rhombus shape of the openings 187a and 187b. The boundary line of the step structure of the pixel electrode 191 matches outlines of the openings 187a and 187b of the second passivation layer 180q. That is, the pixel electrode 191 is disposed on the second passivation layer 180q and the openings 187a and 187b and thus, has the step structure at the outlines of the openings 187a and 187b. In such an embodiment, the step structure of the pixel electrode 191 may include an upper portion disposed on the second passivation layer 180q and a lower portion disposed in a same layer as the second passivation layer 180q on the color filter 230. The boundary line of the step structure is a boundary line between the lower and upper portions of the step structure.

The boundary line of the step structure has substantially the same shape as the outlines of the openings 187a and 187b. Accordingly, a vertex of the rhombus shape corresponding to the boundary line of the step structure may be chamfered.

The boundary line of the step structure of the pixel electrode 191 has a boundary structure corresponding to the tapered angle of the side of the second passivation layer 180q such that the boundary structure forms an angle in a range of about 35 degrees to about 65 degrees with the first substrate 110.

The step structure may have a step difference in a range of about 500 Å to about 2,200 Å, which corresponds to the thickness of the second passivation layer 180q.

The pixel electrode 191 includes the first sub-pixel electrode 191h and the second sub-pixel electrode 191l that are separate from each other based on the gate line 121 and the decompression gate line 123, are disposed in upper and lower portion of a pixel region PX based on the gate line 121 and the decompression gate line 123, and thereby neighbor each other in the vertical direction.

The first sub-pixel electrode 191h and the second sub-pixel electrode 191l are connected to the first drain electrode 175h and the second drain electrode 175l through the first contact hole 185h and the second contact hole 185l, respectively. Accordingly, when the first thin film transistor (Qh) and the second thin film transistor (Ql) are in a turn-on state, the first sub-pixel electrode 191h and the second sub-pixel electrode 191l are applied with data voltage from the first drain electrode 175h and the second drain electrode 175l, respectively.

A first alignment layer 11 is disposed on the pixel electrode 191 and the second passivation layer 180q. The first alignment layer 11 may be a vertical alignment layer, and may be an alignment layer, which is photo-aligned using a photo-polymerization material.

Hereinafter, the upper panel 200 will be described in greater detail.

The common electrode 270 is disposed on a second substrate 210 of the upper panel 200. The common electrode 270 may include a transparent conductive material such as ITO and IZO, for example. A constant voltage may be applied to the common electrode 270, and an electric field may be generated between the pixel electrode 191 and the common electrode 270.

First cutouts 271a and 271b are defined in the common electrode 270. The first cutouts 271a and 271b of the common electrode 270 include the first cutout 271a disposed at a position corresponding to the first sub-pixel electrode 191h and the first cutout 271b disposed at a position corresponding to the second sub-pixel electrode 191l.

The first cutouts 271a and 271b of the common electrode 270 may have a cross shape when viewed from a top view. End portions of the first cutouts 271a and 271b are further protruded from edges of the first sub-pixel electrode 191h and the second sub-pixel electrode 191l, respectively. As described above, in such an embodiment, where an edge of a cutout of the common electrode 270 is further protruded from an edge of the pixel electrode 191, a fringe field may be further stably influence an edge of a pixel region and thereby, alignment of liquid crystal molecules is effectively adjusted in a predetermined direction even at the edge of the pixel region.

The width of each of the first cutouts 271a and 271b of the common electrode 270 may be less than or equal to about three times the height of the liquid crystal layer 3, that is, a cell gap. Herein, a width of a cutout may be defined as a length of the cutout in a direction substantially perpendicular to an extending direction of the cutout.

A second alignment layer 21 is disposed on the common electrode 270. The second alignment layer 21 may be a vertical alignment layer, and may be an alignment layer photo-aligned using a photo-polymerization material.

A polarizer (not shown) may be provided on an outer surface of each of the lower panel 100 and the upper panel 200. Polarization axes of two polarizers on the outer surface of the lower panel 100 and the upper panel 200 are substantially orthogonal to each other and a polarization axis of one of the two polarizers may be substantially parallel to an extending direction of the gate line 121. In an exemplary embodiment, where the display device is a reflection type display device, one of the two polarizers may be omitted.

The liquid crystal layer 3 has a negative dielectric anisotropy, and longitudinal axes of liquid crystal molecules of the liquid crystal layer 3 are aligned to be substantially vertical with respect to the surface of two display panels, that is, the lower panel 100 and the upper panel 200 in a state in which an electric field is not generated therebetween. Accordingly, in a state in which the electric field is not generated, incident light is blocked by the two polarizers having polarization axes substantially perpendicular to each other.

The first sub-pixel electrode 191h and the second sub-pixel electrode 191l, to which data voltage is applied, generate the electric field together with the common electrode 270 and thereby, determine a direction of each liquid crystal molecules 310 of the liquid crystal layer 3 positioned between two electrodes, that is, the pixel electrode 191 and the common electrode 270. Luminance of light passing through the liquid crystal layer 3 varies based on the determined direction of liquid crystal molecules 310.

The first sub-pixel electrode 191h and the common electrode 270 form the first liquid crystal capacitor (Clch) together with the liquid crystal layer 3 disposed therebetween. The second sub-pixel electrode 191l and the common electrode 270 form the second liquid crystal capacitor (Clcl) together with the liquid crystal layer 3 disposed therebetween. Accordingly, the first and second thin film transistors (Qh and Ql) maintain the applied voltage even after the first and second thin film transistors (Qh and Ql) are turned off.

The first and second sub-pixel electrodes 191h and 191l overlap the storage electrode line 131 or the storage electrode 133 to thereby form the first and second storage capacitors (Csth and Cstl), respectively. The first and second storage capacitors (Csth and Cstl) reinforce voltage storage capacity of the first and second liquid crystal capacitors (Clch and Clcl), respectively.

Wide end portions of the protruding portion 134 and a wide end portion 177c of the third source electrode 173c overlap each other based on the gate insulating layer 140 to thereby form the decompression capacitor (Cstd).

As described above, in an exemplary embodiment, the first sub-pixel electrode 191h and the second sub-pixel electrode 191l, to which the data voltage is applied, generate the electric field together with the common electrode 270. Accordingly, in a state in which the electric field is absent, the liquid crystal molecules 310 of the liquid crystal layer 3 aligned to be substantially vertical with respect to the surface of two electrodes, that is, the pixel electrode 191 and the common electrode 270 inclined in a direction substantially horizontal to the surface of two electrodes, that is, the pixel electrode 191 and the common electrode 270, and luminance of light passing through the liquid crystal layer 3 varies based on an inclination degree of liquid crystal molecules 310.

The liquid crystal layer 3 includes the liquid crystal molecules 310 having a negative dielectric anisotropy and a polymer. The liquid crystal molecules 310 are aligned in a predetermined direction such that a longitudinal axis thereof has a pretilt angle by the polymer to be substantially parallel to a direction that faces a middle portion of the cross-shaped first cutouts 271a and 271b of the common electrode 270 from four portions at which edges of the sub-pixel electrodes 191h and 191l extending in different directions meet, by the first cutouts 271a and 271b of the common electrode 270 and the edges of the first and second sub-pixel electrodes 191h and 191l, and to be substantially vertical to the surface of the first substrate 110. Accordingly, each of the first and second sub-pixel electrodes 191h and 191l has four sub-regions in which pretilt directions of liquid crystal molecules 310 are different from each other.

Hereinafter, a unit region of a field generating electrode of an exemplary embodiment of an LCD, according to the invention, will be described with reference to FIG. 4.

Figure 4:
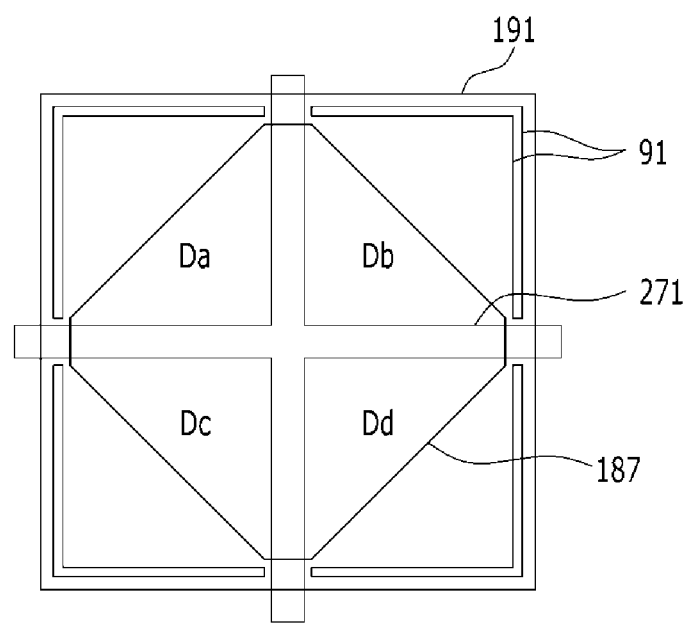
FIG. 4 is a top plan view illustrating a unit region of a field generating electrode of an exemplary embodiment of an LCD, according to the invention.

FIG. 4 is a top plan view illustrating a unit region of a field generating electrode of an exemplary embodiment of an LCD, according to the invention.

As illustrated in FIG. 4, the unit region of the field generating electrode includes the pixel electrode 191 disposed to face a first cutout 271 in the common electrode 270, and a second cutout 91 in the pixel electrode 191 disposed to surround the first cutout 271 in the common electrode 270. When viewed from a top view, the unit region defined by the first cutout 271 in the common electrode 270 and the edge of the pixel electrode 191 may be divided in a plurality of sub-regions (Da, Db, Dc and Dd). The plurality of sub-regions may be disposed symmetrical to each other with respect to the first cutout 271 in the common electrode 270.

The second cutout 91 in the pixel electrode 191 has a substantially rectangular ring shape along the edge of the pixel electrode 191, and is disconnected around a portion corresponding to an end portion of the first cutout 271 in the common electrode 270. As described above, a portion on the pixel electrode 191 where the second cutout 91 in the pixel electrode 191 is disconnected may be a connecting portion of the pixel electrode 191. A width of the connecting portion of the pixel electrode 191 is greater than a width of the first cutout 271 in the common electrode 270 corresponding thereto.

An opening 187 is defined in the second passivation layer 180q positioned below the pixel electrode 191, and accordingly, the pixel electrode 191 has a step structure having a height difference corresponding to the thickness of the second passivation layer 180q. The boundary line of the step structure and the outline of the opening 187 may have a rhombus shape, and the first cutout 271 in the common electrode 270 is disposed to overlap two diagonals in the rhombus shape.

A liquid crystal controlling power of a portion towards four vertices of the pixel electrode 191 from a central portion of the first cutout 271 in the common electrode 270 may become relatively weak compared to other portions. In an exemplary embodiment of an LCD according to the invention, the portion having the relatively weak liquid crystal controlling power is reinforced by providing the step on the pixel electrode 191 and by additionally generating a fringe field. In such an embodiment, a texture controlling power is substantially improved by additionally generating the fringe field.

In such an embodiment of the LCD, a cross-shaped cutout is formed on a common electrode, but not being limited thereto. In an alternative exemplary embodiment, the cutout may be defined or formed on at least one of a pixel electrode, that is, a field generating electrode, and the common electrode. In one exemplary embodiment, for example, the cross-shaped cutout may be formed on the pixel electrode. In one alternative exemplary embodiment, for example, the cross-shaped cutout may be formed on all of the pixel electrode and the common electrode.

Hereinafter, an exemplary embodiment of a method of initially aligning the liquid crystal molecules 310 to have a pretilt angle will be described with reference to FIG. 5.

Figure 5:
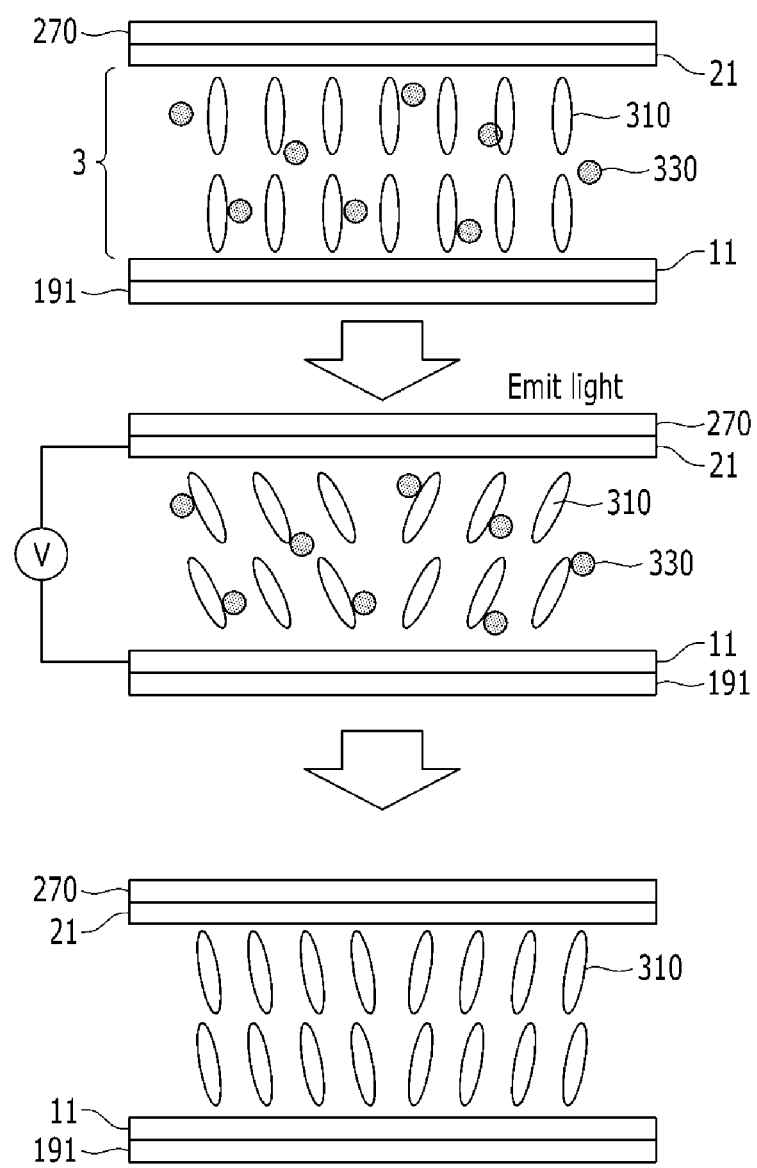
FIG. 5 is a view illustrating a process of enabling liquid crystal molecules to have a pretilt angle using a prepolymer polymerized by light such as ultraviolet rays.

FIG. 5 is a view illustrating an exemplary embodiment of a process of enabling liquid crystal molecules to have a pretilt angle using a prepolymer polymerized by light such as ultraviolet rays.

In such an embodiment, a prepolymer 330 such as monomer to be hardened by polymerization by light such as ultraviolet rays is injected between two display panels, that is, the lower panel 100 and the upper panel 200, together with a liquid crystal material. The prepolymer 330 may be reactive mesogen that performs the polymerization by light such as ultraviolet rays.

Next, an electric field is generated on the liquid crystal layer 3 disposed between two field generating electrodes by applying a data voltage to the pixel electrode 191 and applying a common voltage to the common electrode 270. Next, in response to the electric field, the liquid crystal molecules 310 of the liquid crystal layer 3 are tilted to be substantially parallel to a direction towards a middle portion of the first cutout 271 in the common electrode 270 in a cross shape from four vertices of the pixel electrode 191 by a fringe field generated by the first cutout 271 in the common electrode 270 and the second cutout 91 in the pixel electrode 191. In a unit region, the liquid crystal molecules 310 are tilted in a total of four directions. In such an embodiment, the liquid crystal molecules 310 positioned on four sub-regions that define a unit region are aligned to have different pretilt angles.

In an exemplary embodiment, as described above, the prepolymer 330 is positioned between the liquid crystal molecules 310, but the invention is not limited thereto. In an alternative exemplary embodiment, the prepolymer 330 may also be included in the first and second alignment layers 11 and 21 as well as the liquid crystal layer 3. In such an embodiment, when forming the first alignment layer 11 and the second alignment layer 21, the prepolymer 330 may be provided on each of the first substrate 110 and the second substrate 210 together with an alignment material. The prepolymer 330 may be reactive mesogen that performs the polymerization by light such as ultraviolet rays. Here, the first and second alignment layers 11 and 21 positioned on four sub-regions that define a unit region have different pretilt angles.

Next, an alternative exemplary embodiment of an LCD, according to the invention, will be described with reference to FIG. 6.

Figure 6:
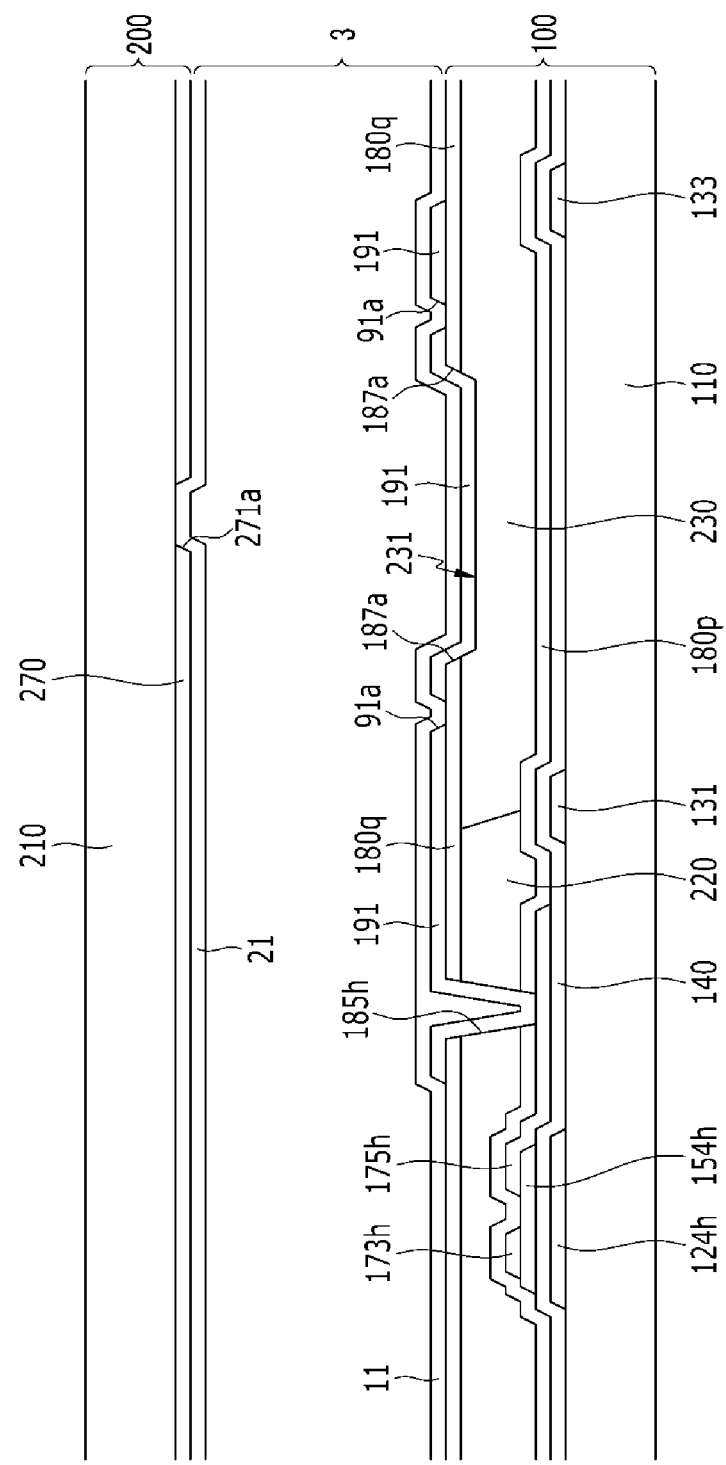
FIG. 6 is a cross-sectional view illustrating a pixel of an alternative exemplary embodiment of an LCD, according to the invention.

FIG. 6 is a cross-sectional view illustrating a pixel of an alternative exemplary embodiment of an LCD, according to the invention.

The LCD shown in FIG. 6 is substantially the same as the LCD shown in FIGS. 1 to 5 except for a groove portion of the color filter 230. The same or like elements shown in FIG. 6 have been labeled with the same reference characters as used above to describe the exemplary embodiments of the LCD shown in FIGS. 1 to 5, and any repetitive detailed description thereof will hereinafter be omitted or simplified.

In the lower panel 100 of an alternative exemplary embodiment of the LCD, as shown in FIG. 6, the first passivation layer 180p, the color filter 230, the light blocking member 220 and the second passivation layer 180q are sequentially disposed or stacked on the first substrate 110.

The openings 187a and 187b in the rhombus shape are defined on the second passivation layer 180q, and the color filter 230 may have a groove portion 231 in the rhombus shape in a portion thereof positioned below the openings 187a and 187b in the second passivation layer 180q. The outline of the groove portion 231 matches the outline of the openings 187a and 187b in the second passivation layer 180q.

The pixel electrode 191 is disposed on the second passivation layer 180q, the openings 187a and 187b and the groove portion 231, such that the pixel electrode 191 has a step structure at an outline of the groove portion 231. Accordingly, the boundary line of the step structure matches the outline of the groove portion 231.

The outline of the groove portion 231 has substantially the same shape as the boundary line of the step structure, and a vertex of the rhombus shape defining the outline of the groove portion 231 may be chamfered.

A side surface of the groove portion 231 may have an angle in a range of about 35 degrees to about 65 degrees with respect to a bottom surface of the groove portion 231.

A sum of the thickness of the second passivation layer 180q and the depth of the groove portion 231 may be in a range of about 500 Å to about 2,200 Å.

In the upper panel 200, the common electrode 270 is disposed on the second substrate 210. The first cutout 271 in the common electrode 270 is disposed to overlap two diagonals in the rhombus shape of the groove portion 231.

In an exemplary embodiment, as described above, a groove portion is defined in a color filter, but the invention is not limited thereto. In an alternative exemplary embodiment, the groove portion may be provided in another organic material layer, for example, an organic insulating layer or an overcoat.

Hereinafter, texture controlling power and transmittance in an exemplary embodiment of an LCD according to the invention will be described with reference to FIGS. 7 through 9.

Figure 7:
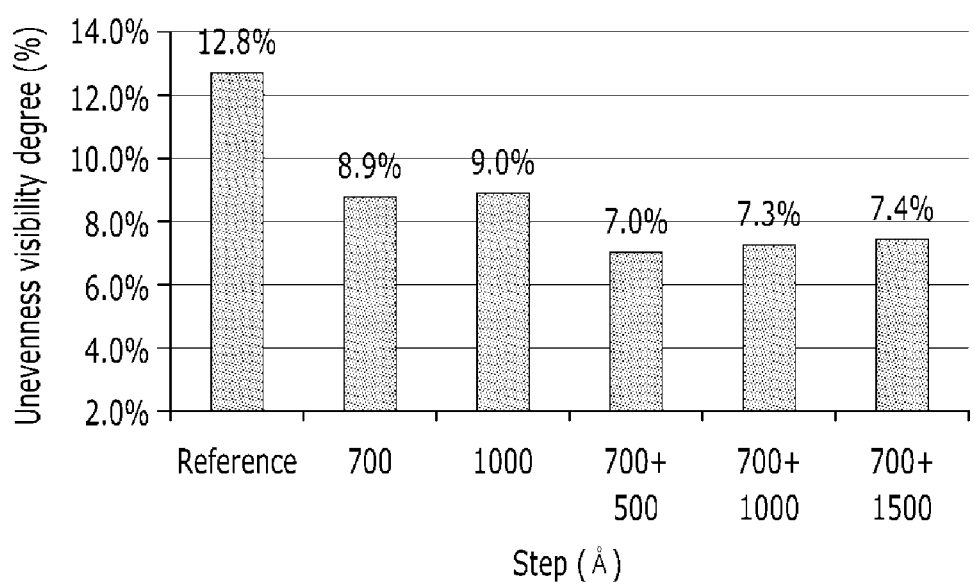
FIG. 7 is a graph illustrating a stain visibility level based on a step structure of a pixel electrode in an exemplary embodiment of an LCD, according to the invention.
Figure 8:
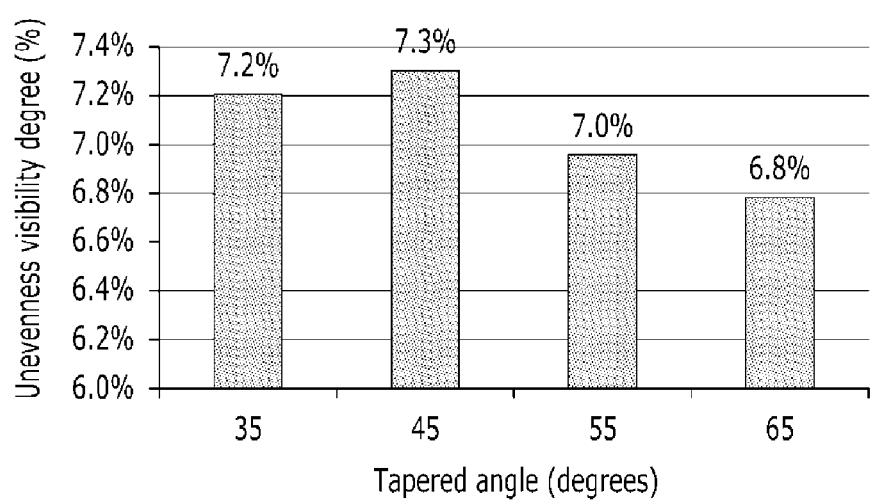
FIG. 8 is a graph illustrating a stain visibility level based on a tapered angle of a second passivation layer in an exemplary embodiment of an LCD, according to the invention.
Figure 9:
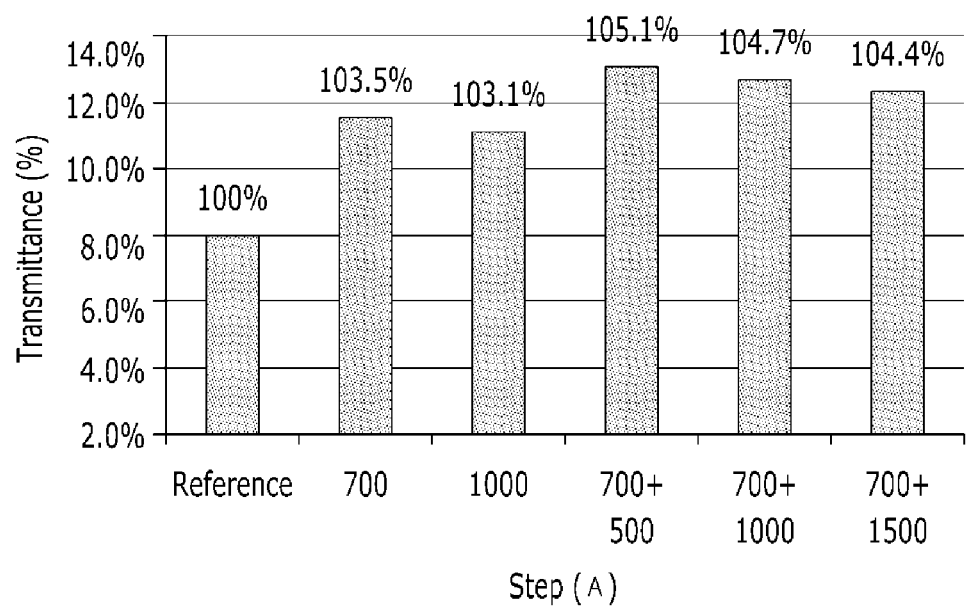
FIG. 9 is a graph illustrating a transmittance based on a step structure of a pixel electrode in an exemplary embodiment of an LCD, according to the invention.

FIG. 7 is a graph illustrating an stain visibility level based on a height of a step structure of a pixel electrode in an exemplary embodiment of an LCD according to the invention, FIG. 8 is a graph illustrating an stain visibility level based on a tapered angle of a second passivation layer in an exemplary embodiment of an LCD according to the invention, and FIG. 9 is a graph illustrating a transmittance based on a height of a step structure of a pixel electrode in an exemplary embodiment of an LCD according to the invention.

In FIG. 7, a horizontal axis denotes a height of the step structure of the pixel electrode. In an exemplary embodiment, the step structure of the pixel electrode may be provided by an opening of the second passivation layer and may also be provided by the color filter. In FIG. 7, from the leftmost bar of the horizontal axis, bars sequentially indicate a reference case in which the step structure of the pixel electrode is absent, an embodiment in which only the opening of the second passivation layer is formed and the thickness of the second passivation layer is about 700 Å, an embodiment in which the thickness of the second passivation layer is about 1000 Å, an embodiment in which the opening of the second passivation layer and the groove portion of the color filter are formed and the thickness of the second passivation layer is about 700 Å, and the depth of the groove portion is about 500 Å, an embodiment in which the thickness of the second passivation layer is about 700 Å and the depth of the groove portion is about 1000 Å, and an embodiment in which the thickness of the second passivation layer is 700 Å and the depth of the groove portion is 1500 Å. The vertical axis of the graph shown in FIG. 7 denotes the stain visibility level, and the stain visibility level decreases as the texture controlling power increases.

Compared to the reference case in which the step structure of the pixel electrode is absent, the stain visibility level decreases in an embodiment in which the step structure of the pixel electrode is provided. For example, in an embodiment in which the thickness of the second passivation layer is about 700 Å and the depth of the groove portion is about 500 Å and thereby, the step structure of the pixel electrode corresponding to a total of about 1200 Å is defined, the stain visibility level is improved by about 45% compared to the reference case in which the step structure of the pixel electrode is absent.

In FIG. 8, a horizontal axis denotes a tapered angle of the second passivation layer at a portion in which the opening is defined or a tapered angle of the color filter at a portion in which the groove portion is defined. A vertical axis denotes the stain visibility level.

As shown in FIG. 8, the stain visibility level minutely decreases as the tapered angle increases. However, when the tapered angle is less than about 35 degrees, the liquid crystal controlling power may decrease. When the tapered angle becomes to be greater than about 65 degrees, light leakage occurs in a black state and thus, a contrast ratio decreases. Accordingly, in an exemplary embodiment, the tapered angle may be in a range of about 35 degrees to about 65 degrees.

In FIG. 9, a horizontal axis denotes a height of the step structure of the pixel electrode, as in the graph shown in FIG. 7, and a vertical axis denotes the transmittance.

As shown in FIG. 9, compared to a reference case in which the step structure of the pixel electrode is absent, the transmittance is improved in an embodiment in which the step structure of the pixel electrode is provided.

Next, another alternative exemplary embodiment of an LCD according to the invention will be described with reference to FIG. 10.

Figure 10:
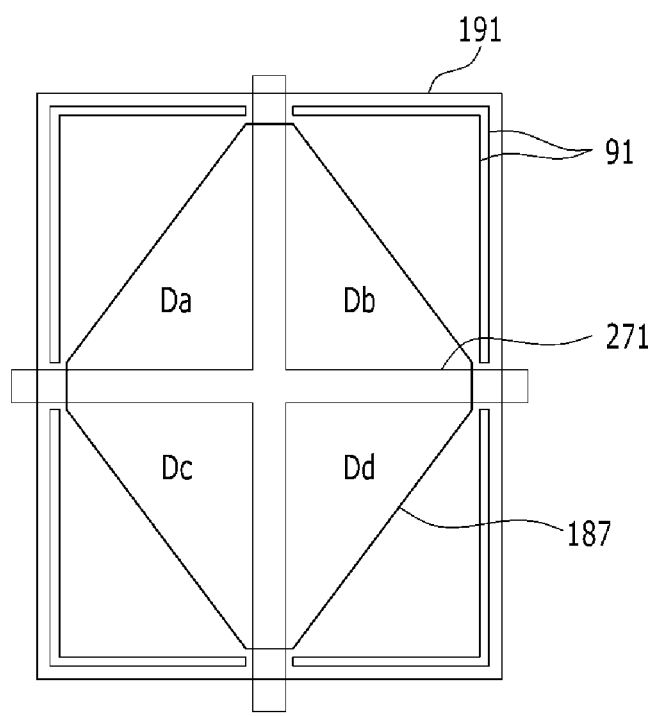
FIG. 10 is a top plan view illustrating a unit region of a field generating electrode of an alternative exemplary embodiment of an LCD, according to the invention.

FIG. 10 is a top plan view illustrating a unit region of a field generating electrode of an LCD according to an exemplary embodiment of the invention.

The LCD shown in FIG. 10 is substantially the same as the LCD shown in FIGS. 1 to 5 except for the field generating electrode. The same or like elements shown in FIG. 6 have been labeled with the same reference characters as used above to describe the exemplary embodiments of the LCD shown in FIGS. 1 to 5, and any repetitive detailed description thereof will hereinafter be omitted or simplified.

As illustrated in FIG. 10, the unit region of the field generating electrode may include the pixel electrode 191 disposed to face the first cutout 271 in the common electrode 270 and the second cutout 91 in the pixel electrode 191 disposed to surround the first cutout 271 in the common electrode 270.

In an exemplary embodiment, as described above, the horizontal length and the vertical length of the unit region of the field generating electrode may be equal to or symmetrical to each other as shown in FIG. 4. In an alternative exemplary embodiment, as shown in FIG. 10, the horizontal length and the vertical length may be different from or asymmetrical to each other.

When the horizontal length and the vertical length are asymmetrical to each other, the liquid crystal controlling power may decrease and texture may occur. In an exemplary embodiment, where the horizontal length and the vertical length are asymmetrical to each other, the texture controlling power is improved by providing the step structure on the pixel electrode 191 and thereby improving the liquid crystal controlling power.

Next, another alternative exemplary embodiment of an LCD according to the invention will be described with reference to FIGS. 11 and 12.

Figure 11:
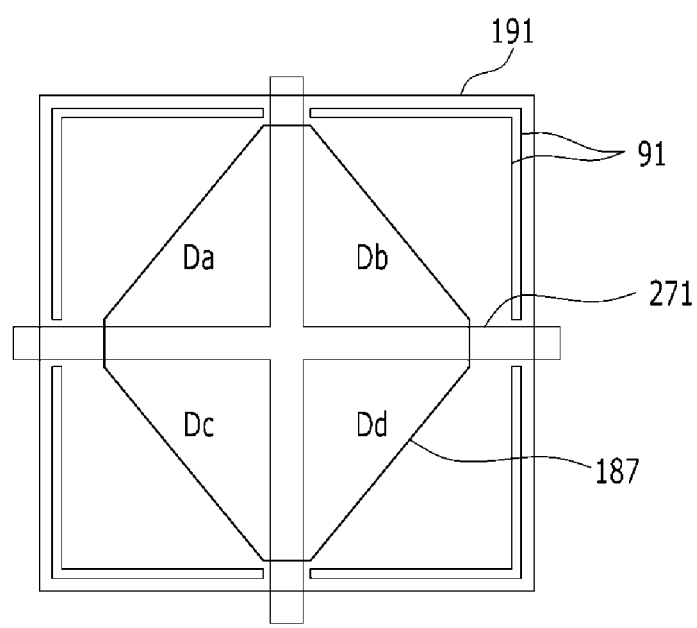
FIG. 11 and FIG. 12 are top plan views illustrating a unit region of a field generating electrode of another alternative exemplary embodiment of an LCD, according to the invention.
Figure 12:
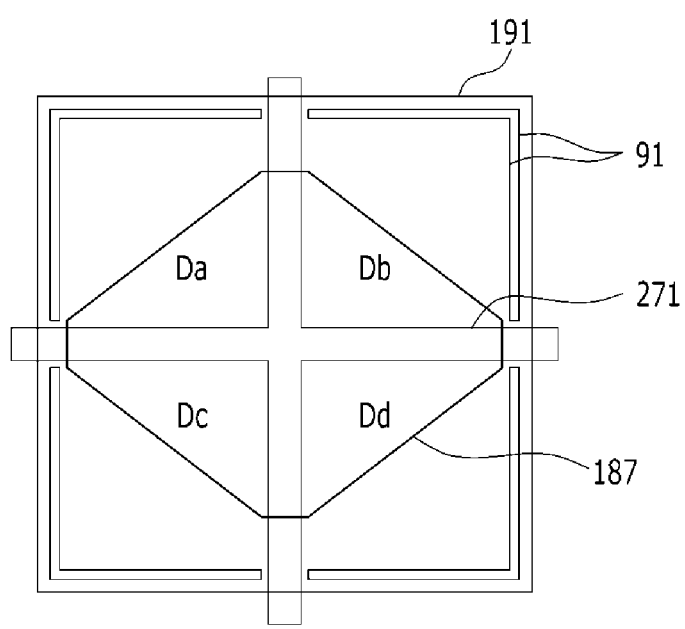

FIG. 11 and FIG. 12 are top plan views illustrating a unit region of a field generating electrode of alternative exemplary embodiments of an LCD according to the invention.

The LCD shown in FIG. 11 or 12 is substantially the same as the LCD shown in FIGS. 1 to 5 except for an angle between the boundary line of the step structure of the pixel electrode and the first cutout in the common electrode. The same or like elements shown in FIG. 6 have been labeled with the same reference characters as used above to describe the exemplary embodiments of the LCD shown in FIGS. 1 to 5, and any repetitive detailed description thereof will hereinafter be omitted or simplified.

A first cutout 271 in a common electrode is provided in a cross shape and thus, includes a horizontal cutout and a vertical cutout.

In an alternative exemplary embodiment, as shown in FIG. 11, an angle between a horizontal cutout of the first cutout 271 in the common electrode and a boundary line of a step structure of a pixel electrode 191 is about 45 degrees or more, for example, about 50 degrees. In an exemplary embodiment in which the step structure of the pixel electrode 191 is provided by an opening 187 of a second passivation layer, an angle between an outline of the opening 187 of the second passivation layer and the horizontal cutout of the first cutout 271 in the common electrode is about 50 degrees. In an alternative exemplary embodiment, in which the step structure of the pixel electrode 191 is provided by the opening 187 of the second passivation layer and a groove portion of a color filter, an angle between the outline of the groove portion and the horizontal cutout of the first cutout 271 in the common electrode is about 50 degrees.

As described above, in an exemplary embodiment in which the angle between the horizontal cutout of the first cutout 271 in the common electrode and the boundary line of the step structure of the pixel electrode 191 is 45 degrees or more, horizontal visibility may be improved by decreasing an azimuth of an initial pretilt of liquid crystal molecules.

In another alternative exemplary embodiment, as shown in FIG. 12, an angle between the horizontal cutout of the first cutout 271 in the common electrode and the boundary line of the step structure of the pixel electrode 191 is 45 degrees or less, for example, about 40 degrees. In an exemplary embodiment in which the step structure of the pixel electrode 191 is provided by the opening 187 of the second passivation layer, an angle between the outline of the opening 187 of the second passivation layer and the horizontal cutout of the first cutout 271 in the common electrode is about 40 degrees. In an alternative exemplary embodiment, in which the step structure of the pixel electrode 191 is provided by the opening 187 of the second passivation layer and the groove portion of the color filter, an angle between the outline of the groove portion and the horizontal cutout of the first cutout 271 in the common electrode is about 40 degrees.

As described above, in such an embodiment in which the angle between the horizontal cutout of the first cutout 271 in the common electrode and the boundary line of the step structure of the pixel electrode 191 is 45 degrees or less, vertical visibility may be improved by increasing an azimuth of an initial pretilt of liquid crystal molecules.

As described above, in an exemplary embodiment of an LCD, an angle between the first cutout 271 in the common electrode and the boundary line of the step structure of the pixel electrode 191 may be adjusted within the range of about 40 degrees to about 50 degrees to improve the horizontal visibility or the vertical visibility of the LCD.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first substrate;
a second substrate disposed opposite to the first substrate;
a pixel electrode disposed on the first substrate;
a common electrode disposed on the second substrate; and
a liquid crystal layer disposed between the first substrate and the second substrate,
wherein
a first cutout having a cross shape is defined in the common electrode,
a second cutout is defined in the pixel electrode to be adjacent to and along an edge of the pixel electrode,
the pixel electrode has a step structure,
a boundary line of the step structure has a rhombus shape, and
the second cutout and the first cutout are nonoverlapping.

2. The liquid crystal display of claim 1, wherein
the first cutout overlaps two diagonal lines in the rhombus shape of the boundary line of the step structure.

3. The liquid crystal display of claim 2, wherein
a vertex of the rhombus shape of the boundary line of the step structure is chamfered.

4. The liquid crystal display of claim 2, wherein
a side surface of the pixel electrode at the boundary line of the step structure forms an angle in a range of about 35 degrees to about 65 degrees with the first substrate.

5. The liquid crystal display of claim 2, wherein
the step structure has a height difference in a range of about 500 angstroms to about 2,200 angstroms.

6. The liquid crystal display of claim 2, wherein
an angle between the boundary line of the step structure and the first cutout is in a range of about 40 degrees to about 50 degrees.

7. The liquid crystal display of claim 1, further comprising:
a passivation layer disposed below the pixel electrode,
wherein an opening in the rhombus shape is defined in the passivation layer.

8. The liquid crystal display of claim 7, wherein
the boundary line of the step structure matches an outline of the opening in the passivation layer.

9. The liquid crystal display of claim 7, wherein
the first cutout overlaps two diagonal lines in the rhombus shape of the opening in the passivation layer.

10. The liquid crystal display of claim 9, wherein
a vertex of the rhombus shape of the opening in the passivation layer is chamfered.

11. The liquid crystal display of claim 9, wherein
a side surface of the passivation layer which defines the opening has a tapered angle in a range of about 35 degrees to about 65 degrees.

12. The liquid crystal display of claim 9, wherein
a thickness of the passivation layer is in a range of about 500 angstroms to about 2,200 angstroms.

13. The liquid crystal display of claim 9, wherein
an angle between an outline of the opening in the passivation layer and the first cutout is in a range of about 40 degrees to about 50 degrees.

14. The liquid crystal display of claim 7, further comprising:
an organic material layer disposed below the passivation layer; and
the organic material layer comprises a groove portion in the rhombus shape.

15. The liquid crystal display of claim 14, wherein
the organic material layer comprises at least one of a color filter, an organic insulating layer and an overcoat.

16. The liquid crystal display of claim 14, wherein
the boundary line of the step structure matches an outline of the groove portion of the organic material layer.

17. The liquid crystal display of claim 14, wherein
the first cutout overlaps two diagonal lines in the rhombus shape of the groove portion.

18. The liquid crystal display of claim 17, wherein
a side surface of the groove portion forms an angle in a range of about 35 degrees to about 65 degrees with respect to a bottom surface of the organic material layer.

19. The liquid crystal display of claim 1, further comprising:
a first alignment layer disposed on the first substrate and the pixel electrode; and
a second alignment layer disposed on the second substrate and the common electrode,
wherein
the first alignment layer and the second alignment layer are vertical alignment layers,
the liquid crystal layer comprises liquid crystal molecules and reactive mesogen, and
the liquid crystal molecules are aligned to have a pretilt angle.

20. The liquid crystal display of claim 1, further comprising:
a first alignment layer disposed on the first substrate and the pixel electrode; and
a second alignment layer disposed on the second substrate and the common electrode,
wherein
the first alignment layer and the second alignment layer comprises an alignment material and reactive mesogen, and
the first alignment layer and the second alignment layer align liquid crystal molecules in the liquid crystal layer to have a pretilt angle.

21. The liquid crystal display of claim 1, wherein the first cutout extends beyond a peripheral edge defining the pixel electrode.

22. The liquid crystal display of claim 1, wherein the second cutout maintains electrical continuity throughout the entire pixel electrode.

* * * * *